April 1, 1924.  
B. J. MUMM ET AL  
FORMER FOR MAKING SAUSAGE CASINGS  
Filed Jan. 25, 1923  
1,488,698  
2 Sheets-Sheet 1
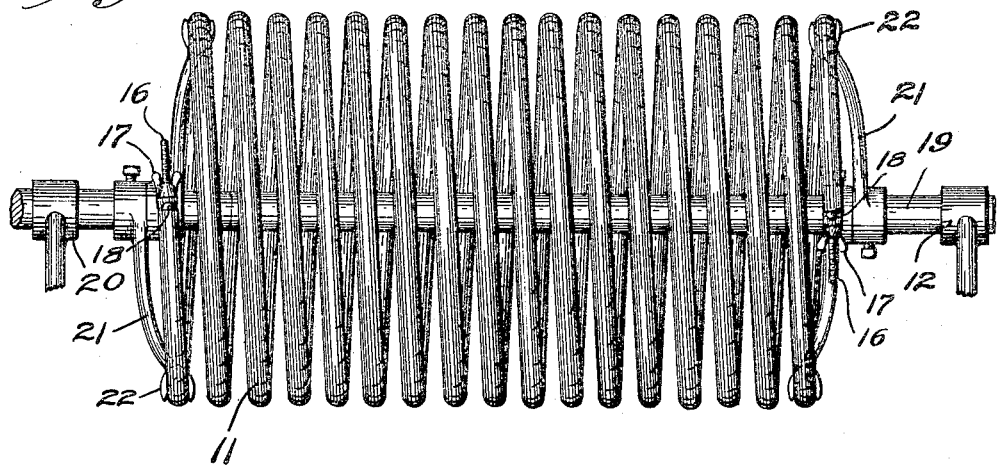
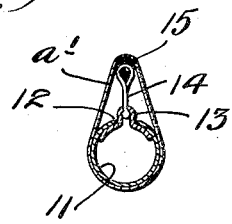
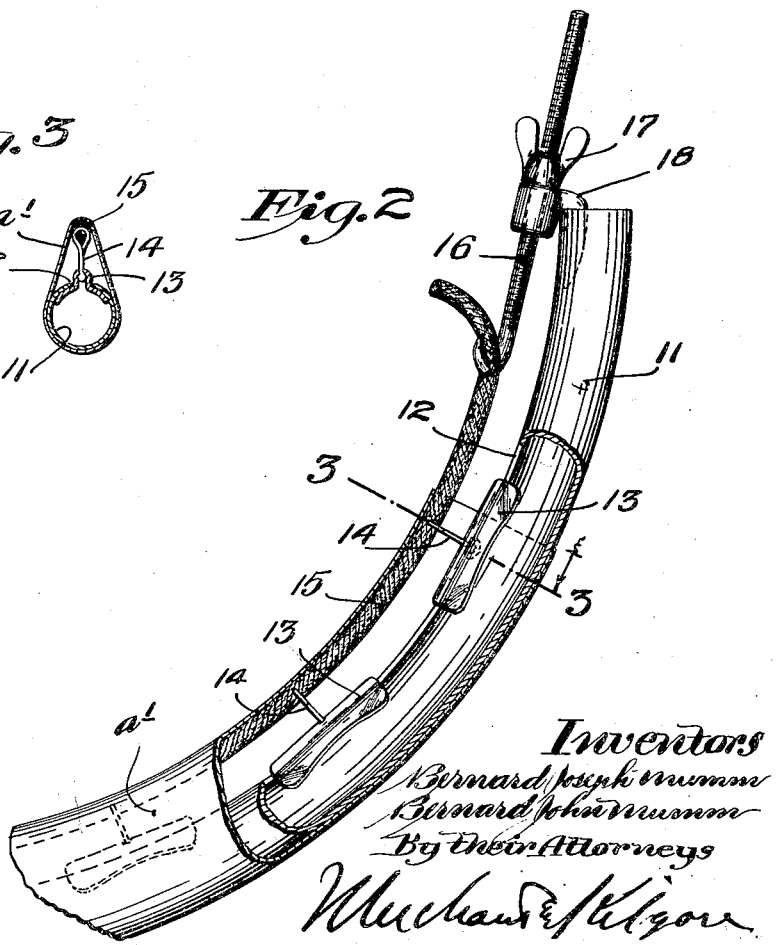
Inventors  
Bernard Joseph Mumm  
Bernard John Mumm  
By their Attorneys

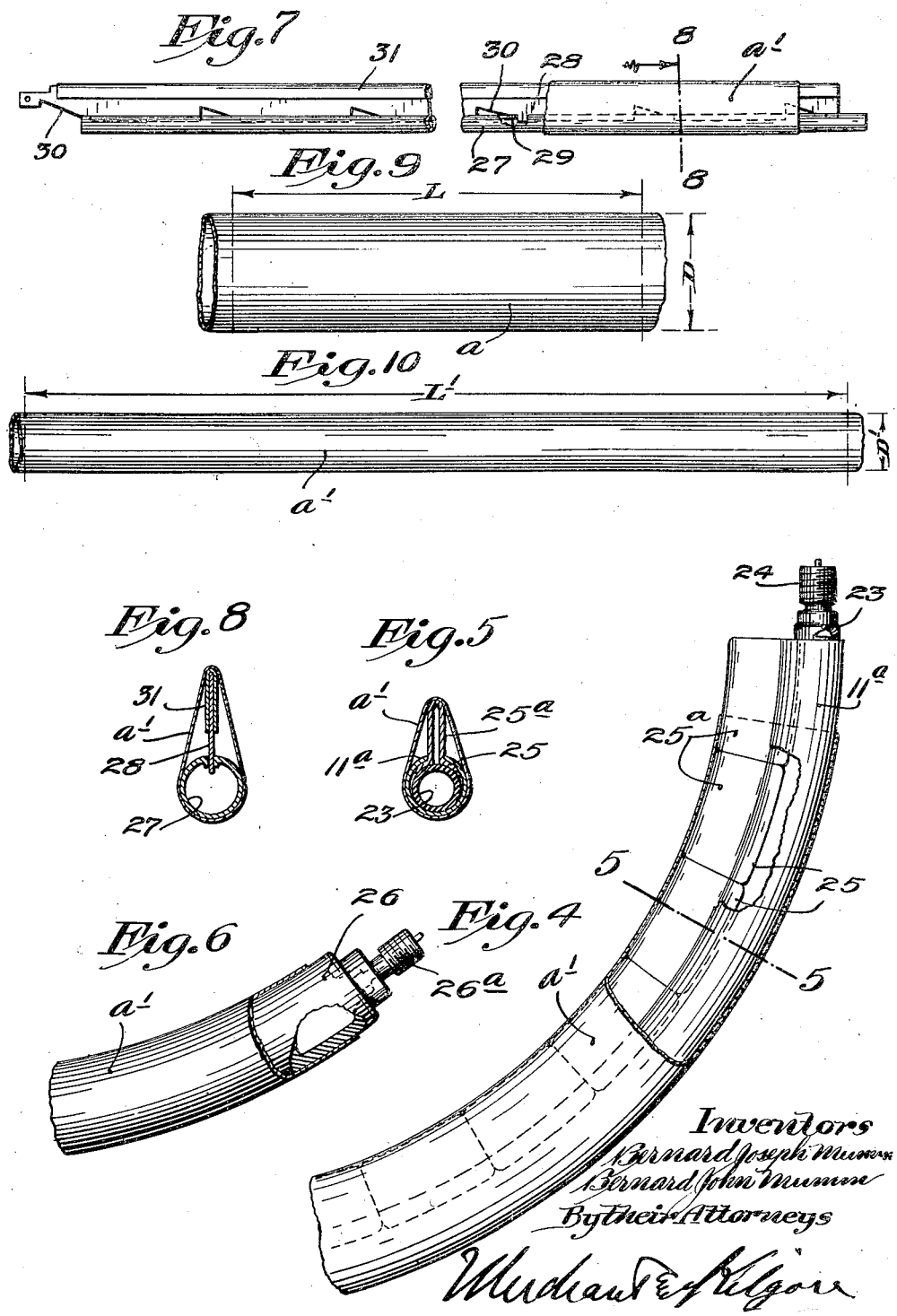

Patented Apr. 1, 1924.

1,488,698

UNITED STATES PATENT OFFICE.

BERNARD JOSEPH MUMM AND BERNARD JOHN MUMM, OF ST. PAUL, MINNESOTA.

FORMER FOR MAKING SAUSAGE CASINGS.

Application filed January 25, 1923. Serial No. 614,845.

*To all whom it may concern:*

Be it known that we, BERNARD JOSEPH MUMM and BERNARD JOHN MUMM, citizens of the United States, residing at St. Paul, in the county of Ramsey and State of Minnesota, have invented certain new and useful Improvements in Formers for Making Sausage Casings; and we do hereby declare the following to be a full, clear, and exact description of the invention, such as will enable others skilled in the art to which it appertains to make and use the same.

Our invention provides an improved former for use in making relatively small sausage casings from relatively large intestines. To such ends, generally stated, the invention consists of the novel construction, combination and arrangement of parts hereinafter described and defined in the claims. Particularly, the improved former is designed for use in making sausage casings of the type disclosed and claimed in our companion application filed of even date herewith and entitled "Sausage casing and process of producing the same" and for carrying out the process whereby said improved product is produced.

The better grades of sausage, such as the so-called "fancy breakfast" sausage and weiner sausage, require small thin casings that are strong enough to stand the strain of filling, handling and cooking. Animal intestines are the only suitable source of sausage casings so far discovered. Sheep intestines are the only available animal intestines small enough for the fancy or small sausage and the imported sheep intestines have been found much better than the domestic sheep intestines. Moreover, sheep intestines, whether imported or domestic, are very much higher in price than the intestines of hogs and cattle. Cattle and hog intestines, however, are too large for fancy casings.

Our invention provides efficient mechanical means in the nature of a former for the production, on a commercial scale and at a low cost, of the relatively small sausage casings made from the cheap and relatively large animal intestines, such as hog intestines.

In the accompanying drawings, which illustrate the invention, like characters indicate like parts throughout the several views.

Referring to the drawings:

Fig. 1 is a plan view illustrating what is at present believed to be the preferred embodiment of our invention;

Fig. 2 is an enlarged fragmentary view partly in elevation and partly in section, showing one end portion of the former illustrated in Fig. 1;

Fig. 3 is a section on the line 3—3 of Fig. 2;

Fig. 4 is a view corresponding to Fig. 2, but illustrating a smaller modified construction;

Fig. 5 is a section on the line 5—5 of Fig. 4;

Fig. 6 is another view corresponding to Fig. 2, but illustrating a still further modified construction;

Fig. 7 is a plan view showing our invention embodied in a straight former;

Fig. 8 is an enlarged section on the line 8—8 of Fig. 7;

Fig. 9 is a plan view showing a section of a normal relatively large intestine, such as a hog intestine; and Fig. 10 is a plan view showing the longitudinally stretched and circumferentially contracted casing.

The main element of the former is preferably of spiral form and, as shown, this main element is in the form of a steel or other metallic tube 11 bent in the form of a cylindrical coil and provided on its concave side with a long slot 12. Working through the slot 12 are travelling cable anchors 13 having flanges expanded within the tube and having projecting hooks 14 that engage a rope or cable 15 at their projecting ends. The ends of said cable 15 are attached to the hook-like ends of draw-bolts 16 equipped with nuts 17. Said draw-bolts 16 work freely through the heads of anchoring hook lugs 18 applied to the extreme ends of the tube 11.

As an auxiliary device, probably desirable but by no means absolutely necessary, we provide axially spaced short rotary shafts 19 journaled in suitable bearings 20 and provided with radial arms 21, the ends of which are forked at 22. The end convolutions of the coil tube 11 are adapted to be readily sprung onto and off from the arm hooks 22, and when the coil is thus supported, it may be rotated and, assuming that the bearings 20 are movable, the coil may be moved into and out of a vat containing a fat-reducing solution, such, for example, as soda ash dissolved in water or lime water.

Preferably the cable 15 will be drawn taut before the intestine is telescoped over the former, but the said cable might be slack. At any rate, the intestine must be of a size that will adapt it to be telescoped over the complete former. Thus, by stretching the intestine lengthwise, its diameter will be decreased until it fits sungly on the former. The friction between the intestine and the tube 11 and the cable 15 of the former will frictionally hold the intestine against lengthwise contraction and hence in the condition of decreased diameter just described. In this condition, the intestine will be dried, and when dried, will maintain its relatively great length and relatively small diameter; that is, will have a much greater length and much smaller diameter that the original intestine. The intestine dried on the former, as stated, cannot be removed if the former were not contractible in diameter or transverse cross section, and this contraction of the former is accomplished simply by loosening or giving increased slack to the cable 15. When the former is thus contracted, the dried intestine will be much greater in diameter or cross section than the former and the intestine may then be drawn endwise off from the former. The former is not actually used to stretch the intestine, but serves to hold the intestine after it has been stretched and decreased in diameter by a hand operation or otherwise, and while it is being dried. The transversely contractible feature of the former, as above indicated, is for the purpose of making a dried intestine readily removable without damage to the intestine.

In thus applying the intestine on the former, the short side of the intestine should be placed at the concave side of the former. This is quite important because animal intestines generally have a longitudinal curve. When the intestine is thus stretched, the frictional contact between the same and the former will hold the same against longitudinal contraction while the intestine reduced to the proper size for small casings is being cured. The curing process will permanently set the particles of the intestine so that the intestine will not return to its original relatively large diameter but, on the contrary, will maintain its reduced diameter.

Before the intestine is applied on the former, fat particles should be removed therefrom by suitable means, such as that disclosed, for example, in our co-pending application. The curing of the casing after it has been reduced to the proper size, as above stated, may be accomplished by the use of smoke from combustion, by "liquid" smoke, by alkali or acid fumes, or by any other approved means. After the casing has been cured and dried, it should be removed from the former, and to make it possible and easy to thus remove the same, the cable or cord 15 is given slack or entirely released, so that it will drop out of contact with the casing and thereby decrease the effective transverse section of the complete former.

When the cord or cable 15 is tightened or released, the travelling cable anchors 13 freely move in the slot 12 of the former tube 11 and this action is of the utmost importance in a curved or spiral former of any considerable length, for it affords the simplest kind of means for distributing the strain on the cable throughout its entire length. Obviously, tension on the cable tends to move the same laterally away from the concave side of the coiled former tube and such movement is limited by the hooks 14 of the travelling anchors 13.

In the modified construction illustrated in Figs. 4 and 5, a slotted spiral metal tube 11$^a$, similar to the tube 11 before described, is employed, but within this tube is placed an expansible pneumatic tube 23 provided at one end with a valve-equipped charging stem 24 to which the coupling of a charging tube may be applied.

The laterally expansible and contractible feature of the former is here afforded by a plurality of blades 25 working through the slot of the tube 23. Preferably, these blades 24 are formed of thin sheet metal bent double and having outstanding base flanges 25$^a$ located between the tubes 11$^a$ and 23. With this arrangement, when the pneumatic tube 23 is inflated, the blades 25 will be forced outward to thereby give the former its maximum cross-section, but when said tube 23 is deflated, the blades 24 may be readily pressed inward so as to permit the ready removal of the completed casing.

In Fig. 9, the original or normal intestine is indicated by the character $a$, and in Fig. 10 and certain other views, the casing made from said intestine is indicated by the character $a^1$.

In the construction illustrated in Fig. 6, the expansible former is afforded simply by an expansible and collapsible pneumatic tube 26 provided at one end with a valve-equipped charging nipple 26$^a$.

Figs. 7 and 8 illustrate another possible modification of the former in which the former is made on straight lines. This former comprises a tube 27 and an expansion blade 28. The tube 27 is formed with longitudinal slots separated only by small connecting webs 29. The blade 28 is formed with cam surfaces 30 that engage the cross webs 29 and cause said blade to move radially outward when moved endwise in a direction from the right toward the left in respect to Fig. 7. As shown, the blade 28 is faced with a metal strip 31 bent U-shaped over the said blade and providing the latter with a rounded outer edge that will not injure the sausage casing $a^1$.

With this type of construction, the completed sausage casing may be readily removed from the former when the blade 28 is moved toward the right in respect to Fig. 7, so as to transversely contract or collapse the former. The straight type of former may be used for some purposes or when but short casings are to be made, but for long casings, a spiral or bent manifold type of former will be required.

From what has been said, it must be obvious that our invention, as herein disclosed, is capable of very considerable modification within the spirit of the invention and the claims thereon herein made.

What we claim is:

1. A transversely expansible and contractible former for use in making sausage casings from animal intestines of larger diameter.

2. A bent or tortuous transversely expansible and contractible former for use in making sausage casings from animal intestines of larger diameter.

3. A spiral transversely expansible and contractible former for use in making sausage casings from animal intestines of larger diameter.

4. A former for use in making sausage casings from animal intestines of larger diameter, comprising a tubular body member and a transversely movable expansion member.

5. A former for use in making sausage casings from animal intestines of larger diameter, comprising a curved tube slotted on its concave side, and transversely movable expansion means connected to said tubular body member through the slot thereof.

6. A former for use in making sausage casings from animal intestines of larger diameter, comprising a curved tube slotted on its concave side, an expansion cable anchored at its ends to the ends of said tube, and travelling anchors working through the slot of said tube and connected to the intermediate portions of said cable at different points.

7. A former for use in making sausage casings from animal intestines of larger diameter, comprising a curved tube slotted on its concave side, an expansion cable anchored at its ends to the ends of said tube, travelling anchors working through the slot of said tube and connected to the intermediate portions of said cable at different points, and adjustable means for clamping and loosening said cable.

8. A former for use in making sausage casings from animal intestines of larger diameter, comprising a spiral tube slotted on its concave side, an expansion cable anchored at its ends to the ends of said tube, and travelling anchors working through the slot of said tube and connected to the intermediate portions of said cable at different points.

9. A former for use in making sausage casings from animal intestines of larger diameter, comprising a spiral tube slotted on its concave side, an expansion cable anchored at its ends to the ends of said tube, travelling anchors working through the slot of said tube and connected to the intermediate portions of said cable at different points, and adjustable means for clamping and loosening said cable.

In testimony whereof we affix our signatures.

BERNARD JOSEPH MUMM.
BERNARD JOHN MUMM.